Patented Apr. 26, 1938

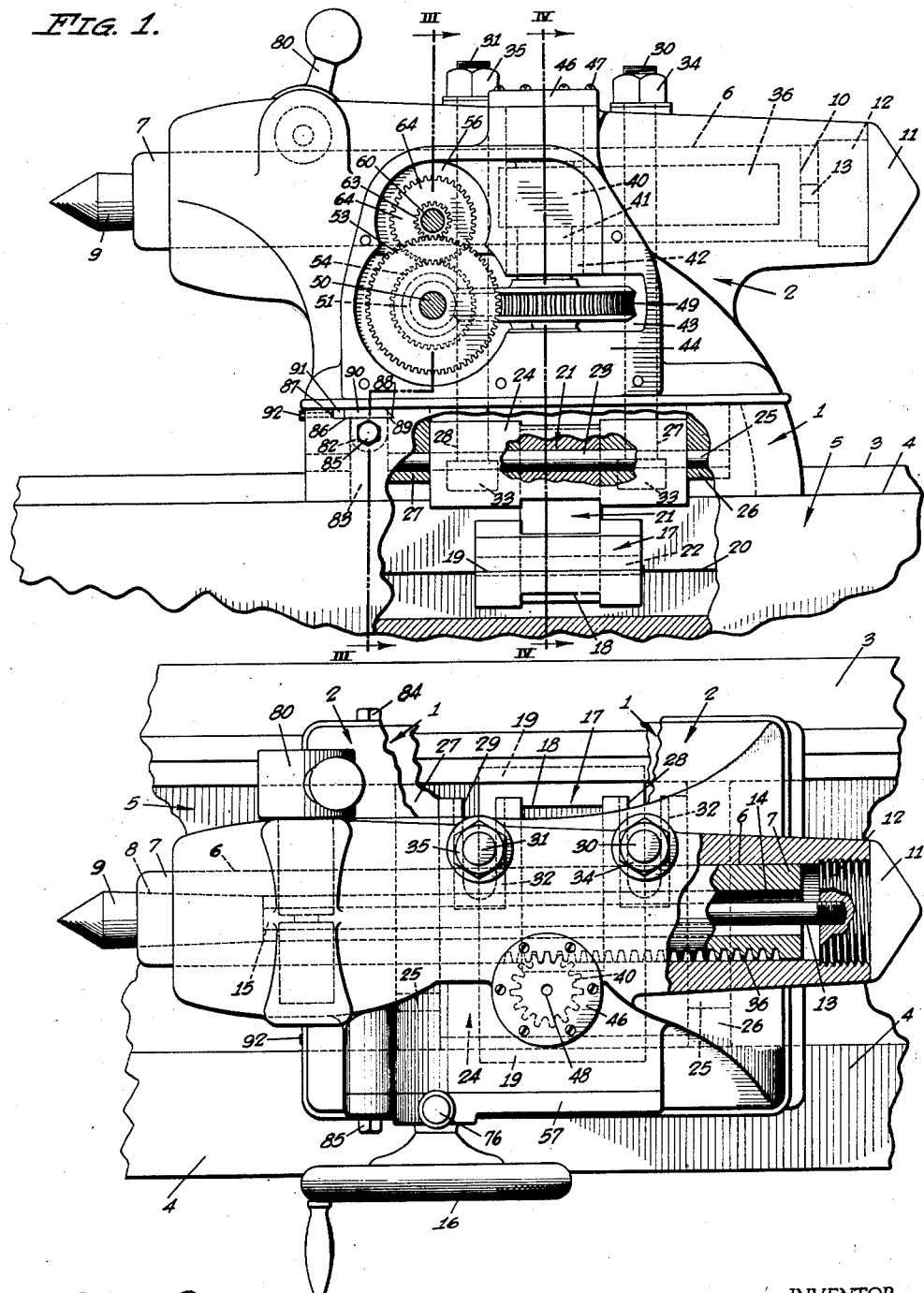

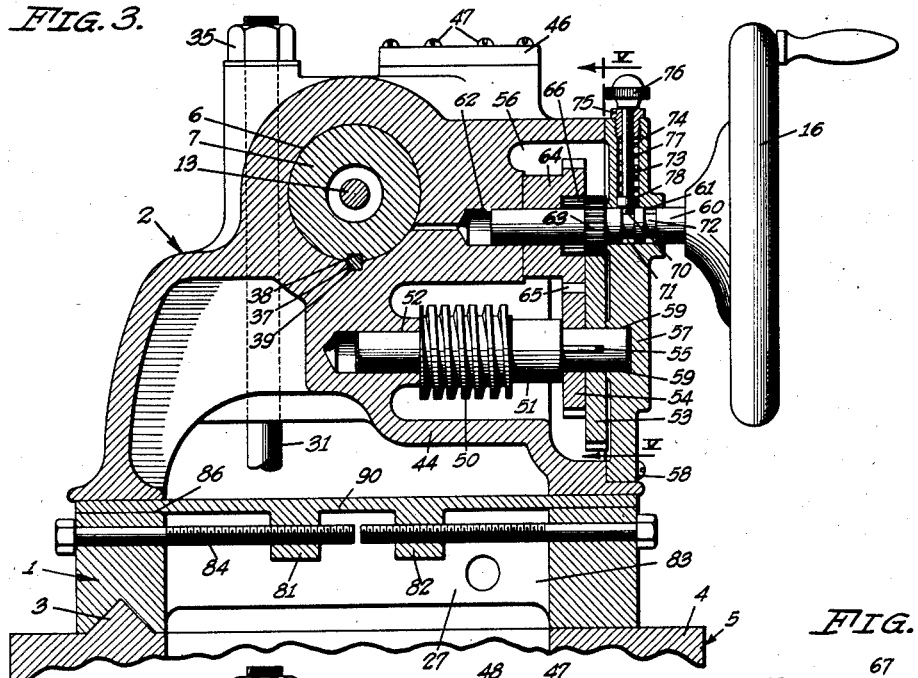
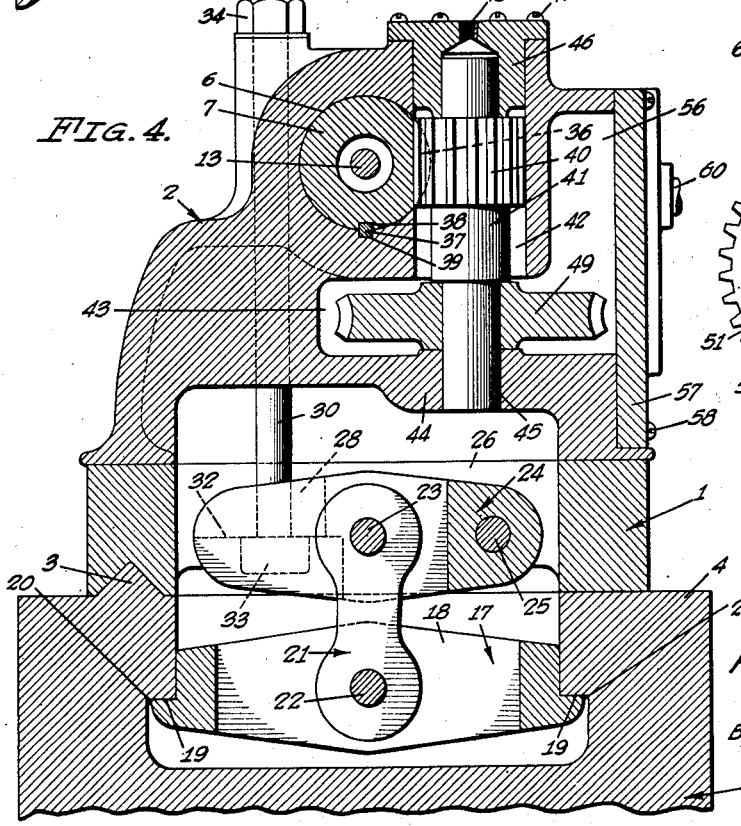
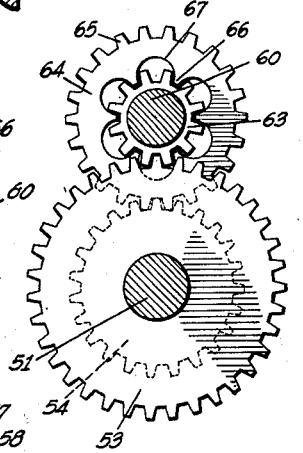

2,115,094

UNITED STATES PATENT OFFICE

2,115,094

TAILSTOCK FOR LATHES

Frank P. Bucklein, Los Angeles, Calif., assignor to Axelson Manufacturing Co., Los Angeles, Calif., a corporation of California Application June 25, 1937, Serial No. 150,304

16 Claims. (Cl. 82—31)

My invention relates to tailstocks for lathes and similar machines and has particular reference to a tailstock provided with a multiple speed control for the tailstock spindle and to a novel clamping mechanism by which the tailstock may be fixed in any adjusted position on the bed of the machine.

In the operation of machines such as lathes, wherein a workpiece is to be placed, the tailstock is normally roughly adjusted to approximately the correct position along the bed of the lathe to accommodate the desired length of workpiece, the tailstock then being clamped in such roughly adjusted position, and the spindle of the tailstock is then moved forwardly or rearwardly to accurately receive the workpiece. In making such adjustments it is desirable that the forward and backward movements of the spindle should be capable of accomplishment at a relatively high speed so that little time is lost by the mechanic in setting up the machine with a given workpiece. Also it is frequently desirable to use the tailstock spindle with its forward and rearward movements as a means for holding drills or other cutting tools to permit the drilling of a workpiece or the boring of a workpiece by drills or tools held in the tailstock spindle. In using a tailstock for drilling or boring operations, it is necessary that the spindle be moved forwardly with considerable force so that should the gearing between the handle and the tailstock spindle be of low ratio, desirable for the normal setting up of the machine for turning operations, the amount of force required to be exerted upon the handle for drilling or boring operations would be substantially prohibitive while, on the other hand, should the gearing be of such high ratio as to permit of the transmission of great forces upon a drill or boring tool by a relatively small amount of force exerted upon the handle, the normal setting up of the machine would involve an undesirable waste of time.

It is therefore an object of my invention to provide a tailstock for lathes and similar machines wherein multiple gear ratios are provided, to be selected by the operator, including a relatively low ratio for normal setting up movements of the tailstock spindle and a high ratio for the transmission of forces to the tailstock spindle when the same is to be used for drilling or boring operations.

Another object of my invention is to provide a tailstock spindle of the character set forth in the preceding paragraph wherein the selection of the gear ratios is made by a simple shifting of the handle or handwheel shaft to a plurality of positions.

Another object of my invention is to provide a tailstock spindle of the character set forth in the preceding paragraph wherein one or another of the sets of gears will be connected to the handwheel shaft in all positions of the shaft.

Another object of my invention is to provide a tailstock of the character set forth wherein the handwheel shaft will be latched in any one of its gear selecting positions.

Another object of my invention is to provide a tailstock spindle employing a handwheel for the movement of the spindle within the tailstock and in which a plurality of sets of gears are interposed between the handwheel and the spindle to permit of high and low speed operations of the spindle, and in which a simple shifting of the handwheel and its shaft connects the handwheel with one or the other of said gears.

Another object of my invention is to provide a tailstock of the character set forth in the preceding paragraph wherein a simple pinion on the handwheel shaft may be employed to drive one of said sets of gears and may be employed to act as a clutch to couple said handwheel shaft with the other of said sets of gears.

Another object of my invention is to provide a novel clamping mechanism for tailstocks wherein a clamp is disposed to engage the machine bed and in which the clamping forces are exerted by a plurality of clamping screws and in which the clamping screws are coupled to the clamp in such manner as to evenly distribute the clamping forces throughout the clamp irrespective of the number of clamp screws which are operated.

Another object of my invention is to provide a tailstock having a body or spindle housing shiftable laterally upon a base, and in which guide means is provided for guiding the said lateral movement and to act as a releasable coupling between the body and base to prevent lifting of the body relative to the base by forces exerted on a workpiece held by the tailstock.

Other objects and advantages of my invention will be apparent from a study of the following specifications, read in connection with the accompanying drawings, wherein Fig. 1 is a side elevational view of a portion of a lathe bed and a tailstock constructed in accordance with my invention, the gear case cover being shown as removed to show the disposition of the gearing therein and a portion of the tailstock base and machine bed being broken away to illustrate the clamping mechanism;

Fig. 2 is a top plan view of a machine bed and a tailstock constructed in accordance with my invention, a portion of the spindle housing being broken away to illustrate the structure contained therein;

Fig. 3 is a detail vertical sectional view taken along line III—III of Fig. 1;

Fig. 4 is a detail vertical sectional view taken along line IV—IV of Fig. 1; and Fig. 5 is a detail vertical sectional view taken along line V—V of Fig. 3.

Referring to the drawings, I have illustrated my novel tailstock construction as applied to a lathe, the tailstock including a suitable tailstock base 1 and a spindle housing 2 adapted to rest thereon, the base 1 being adapted to rest upon and to be slidable upon the ways 3 and 4 of a lathe bed 5.

As will be understood by those skilled in the art, the lathe bed 5 includes a pair of parallel ways 3 and 4, along which the tailstock base 1 is adapted to slide toward and away from the headstock of the machine.

The spindle housing 2 is provided with a longitudinally extending bore 6, through which extends the spindle 7, the spindle being normally provided with a tapered bore 8 extending into the forward end thereof adapted to receive and hold a tapered center 9 or the tapered shank of a drill or other tool.

In the construction of the spindle housing 2, I prefer to extend the bore 6 completely through the housing and to construct the spindle 7 of such length that when the spindle 7 is in its rearwardmost position the rear end 10 thereof will lie within the bore 6. As shown particularly in Figs. 1 and 2, the rear end of the spindle housing is preferably formed by a plug 11 suitably threaded as indicated at 12 into the rear end of the bore 6. The plug 11 may then constitute a ready support for a rod 13 extending through an internal bore 14 in the spindle 7, of sufficient length that as the spindle is retracted into the housing 2 almost to its rearwardmost position the forward end 15 of the rod 13 will engage the rear end of the center 9 or other tool and eject the same from the tapered bore 8 in the spindle. By employing such construction, a relatively simple, neat and compact construction of the housing and spindle is achieved.

The spindle 7 is adapted to be moved forwardly and rearwardly of the housing 2 upon the manipulation of a suitable handwheel 16 coupled by gearing as hereinafter described to the spindle 7 while the entire tailstock, including the housing 2 and the base 1, may be moved forwardly and rearwardly along the bed 5 by a simple sliding motion of the base 1 along the ways 3 and 4. As will be understood by those skilled in the art, the normal operation of setting up a workpiece in a machine of this character includes the preliminary adjustment of the tailstock to approximately the correct distance from the headstock to accommodate a given workpiece to be placed in the machine, the usual practice being that of moving the tailstock 1 toward or away from the headstock to space the headstock and tailstock apart a distance somewhat in excess of the length of the workpiece. The tailstock is then securely clamped in its preliminary adjusted position and the center 9 is then moved toward the headstock by movement of the spindle 7.

I have illustrated herein a novel form of clamping mechanism by which the tailstock may be clamped in its preliminary adjusted position, such clamping mechanism including a clamp 17, preferably constructed as a rectangular block of metal having a central recess or slot 18 therein, the opposite side edges of the clamp 17 being constructed with shoulders 19 adapted to engage inwardly extending shoulders 20 formed upon the ways 3 and 4 of the bed 5. The clamp 17 is suspended from the base 1 of the tailstock by means of a relatively heavy link 21 which has one of its ends pivotally connected by means of pivot rod 22 to the clamp 17 while its opposite end is pivotally connected as by pivot rod 23 to a hinged plate 24. The hinged plate 24 is illustrated as being constructed of a relatively U-shaped block of metal, the base of the U-shape being pivoted to the base 1 by means of a pivot pin 25 extending longitudinally of the tailstock base 1, the ends of the pin 25 being suitably supported in bearing members 26 and 27 formed integrally with the tailstock base 1. The outer ends of the legs of the U-shaped hinged plate 24 are provided with laterally extending slots 28 and 29, each of which is adapted to receive the shank of a bolt or screw 30 and 31, respectively.

The underneath surface of each of the legs of the hinged plate 24 is provided with a recess 32 adapted to receive and engage the head 33 of the respective bolts 30—31 to prevent these bolts from turning relative to the hinged plate 24. The bolts 30—31 extend vertically through the housing 2 and are provided upon their upper ends with suitable nuts 34—35, respectively, by which the bolts may be drawn upwardly or allowed to move downwardly to raise and lower the hinged plate 24. The upward movement of either of the bolts 30—31 will cause the hinged plate 24 to move upwardly and by reason of the connection of the clamp 17 to the plate 24 through the link 21, such lifting movement will be transmitted as a direct upward pull on the clamp 17, the forces exerted by the bolts 30 or 31 or both being distributed evenly throughout both sides of the clamp 17 and causing the clamp 17 to evenly distribute the clamping pressure to both of the ways 3 and 4. It will be particularly noted that by employing the hinged plate 24 the clamping operation may be accomplished by the manipulation of only one of the bolts 30 or 31 and the forces exerted thereby will be evenly distributed to the clamping plate, while if desired both of the bolts may be operated and the forces exerted thereby will likewise be evenly transmitted.

By reason of this construction, the time required for an operator to set up the machine for a particular workpiece may be materially reduced since whenever, in the judgment of the operator, a single clamping bolt 30 or 31 will suffice to securely clamp the tailstock in position, he need operate only one of the bolts. If, however, in his opinion, the clamping of the tailstock requires the manipulation of both bolts, he may tighten both of the bolts 30 or 31.

Having initially set the tailstock in the preliminary adjusted position, the operator may then manipulate the handwheel 16 to move the tailstock spindle forwardly or rearwardly to the position necessary to permit the workpiece to be received between the headstock and the tailstock and then, by manipulation of the handwheel 16, he may move the spindle forwardly to clamp the workpiece between the centers of the headstock and tailstock, respectively.

I prefer to transmit the forces exerted upon the handwheel 16 to the tailstock spindle 7 by providing upon one side of the spindle 7 a gear rack 36, which gear rack may be either separately constructed and attached to the spindle 7 or may comprise gear rack teeth cut directly into the side of the spindle 7. By referring particularly to Figs. 3 and 4, it will be noted that the spindle 7 is prevented from rotating relative to the housing 2 by means of a key 37 suitably engaging slots 38 and 39 in the spindle and spindle housing, respectively.

The gear rack 36 on the spindle 7 is suitably meshed with a pinion 40, preferably secured to or formed integrally with a vertically extending shaft 41. The housing 2 is preferably provided with a vertical bore 42 extending from the upper surface of the housing 2 and having its lower end communicating with a laterally extending recess 43, disposed immediately above a laterally extending web 44 cast in the housing 2. The web 44 provides a bearing 45 for the lower end of the shaft 41 while the upper end of the shaft is received in a bearing plug 46 extending into the bore 42 and suitably secured to the housing 2 as by means of screws 47. If desired, a lubricant opening 48 may be provided in the plug 46 whereby lubrication for the shaft 41 and the pinion 40 may be introduced.

The shaft 41 has rigidly secured thereto a worm wheel 49 extending into the lateral recess 43 and meshed (see Figs. 1 and 3) with a worm 50 secured to or formed integrally with a drive shaft 51. The drive shaft 51 is illustrated as extending laterally with respect to the housing 2, having its inner end journaled in the bearing bore 52 formed in the material of the housing. Near the outer end of the shaft 50 a pair of gears 53 and 54 are rigidly secured thereto as by means of a key 55.

As will be observed from an inspection of Figs. 1, 3 and 4, the gears 53 and 54 are received within a gear case comprised by a laterally disposed recess 56, the open face of which is adapted to be covered by a cover plate 57 secured to the housing 2 as by means of screws 58. The cover plate 55 has a bearing bore 59 extending into the inner face thereof, adapted to receive and support the outer end of the shaft 51.

Disposed immediately above and parallel to the shaft 51 is a handwheel shaft 60, upon the outer end of which is mounted the handwheel 16, the shaft 60 extending through a bearing bore 61 in the cover plate 57 and having its opposite end journaled in a bearing bore 62 in the body of the housing 2. It will be observed that the bore 62 is somewhat in excess of the length of the shaft 60 so that the shaft 60 is slidable laterally with respect to the housing 2 to move a pinion 63 (rigid with the shaft 60) from an outermost position, as shown in Fig. 3, wherein the pinion 63 is meshed with the gear 53, to an innermost position wherein the pinion 63 is out of mesh with the gear 53. The shaft 60 has rotatably mounted thereon an auxiliary gear 64, the teeth 65 of which are permanently meshed with the teeth of the gear 54. The gear 64 is provided with internal teeth 66 adapted to be meshed with the teeth of the pinion 63 when the shaft 60 and handwheel 16 are moved inwardly from the position shown in Fig. 3. By referring particularly to Fig. 5, it will be noted that the teeth 66 on the gear 64 may be readily formed by providing a plurality of short bores 67 extending inwardly of the face of the gear 64, the space between the bores 67 constituting the teeth 66 which preferably engage between every other tooth of the pinion 63.

It will therefore be observed that when the handwheel 16 and its shaft 60 are in the outermost position, as shown in Fig. 3, the pinion 63 will be meshed with the gear 53 so that rotation of the handwheel 16 will rotate the shaft 51 at a relatively low speed, this rotation being transmitted through the worm 50 and worm wheel 49 to the pinion 40 and thence to the gear rack 36, moving the spindle 7 forwardly or rearwardly at a relatively low speed while when the handwheel 16 and shaft 60 are in their innermost position, the pinion 63 will be free from the gear 53 but will be clutched to the gear 64 and rotation of the handwheel 16 will rotate the gear 64 and through the gear 54 will rotate the shaft 51 at a much higher speed. This rotation, like the rotation of the shaft 51 previously described, will be transmitted through the worm 50 and worm wheel 49 to move the spindle forwardly and rearwardly at a relatively high speed.

In the initial set-up of the machine for a turning operation the operator will move the handwheel 16 and its shaft 60 inwardly since it is desirable that in setting up a workpiece in the machine the spindle should be operated with as little loss of time as possible and a relatively small amount of manipulation of the handwheel 16 will cause a great amount of movement of the spindle 7.

If, however, it is desired to employ a tailstock and its spindle 7 for drilling or boring a workpiece in the machine, the power which is applied to the handwheel 16 should be transmitted to the spindle 7 by a relatively high gear ratio so that comparatively great force may be exerted upon the spindle 7 by the exertion of comparatively small forces upon the handwheel 16. In this instance, the operator will move the handwheel 16 and its shaft 60 to their outermost position as shown in Fig. 3, meshing the pinion 63 with the gear 53 and, by reason of the relatively low ratio between the pinion 63 and gear 53, the handwheel 16 must be rotated through a considerable number of revolutions in order to move the spindle 7 a relatively short distance but by reason of this gearing substantially small amounts of power applied to the handwheel 16 will be transmitted as great amounts of power to the spindle 7.

It will also be noted that irrespective of the gear ratio employed the movement of the handwheel 16 is transmitted to the spindle 7 through the worm 50 and worm wheel 49, the pitch of which is so selected that the worm 50 cannot be rotated by forces exerted upon the spindle 7. Also the relation between the pinion 63 and the gear 64 is such that in either of the positions of the shaft 60 the handwheel 16 will always be coupled with the spindle 7.

In order to insure against accidental shifting of the handwheel shaft 60 when either of the gear ratios is selected, I provide a latch 70 adapted to engage in an annular recess 71 when the handwheel 16 is in its outermost position or to engage in an annular recess 72 on the shaft 60 when the handwheel 16 is in its innermost position. The latch 70 is preferably formed upon the lower end of a latch stem 73 extending vertically in a bore 74 formed in the cover plate 57. The upper end of the latch stem 73 extends through a bushing 75 and is provided upon its upper end with a handle 76 by which the latch 70 may be lifted when desired. The latch 70 is normally held in its lowermost or recess-engaging position by means of a spring 77 bearing upon the lower surface of the bushing 75 and upon an annular flange 78 formed upon the stem 73.

While as hereinbefore described the pitch of the worm 50 and worm wheel 49 is preferably such as to prevent rotation of the worm wheel by forces exerted upon the spindle 7, the spindle 7 may be clamped in any of its adjusted positions by means of the usual spindle clamping mechanism 80, commonly provided upon machines of this character.

Referring particularly to Figs. 1 and 3, it will be observed that provision is made for the lateral shifting of the spindle housing 2 upon its base 1 to provide for offset adjustment of the spindle 7 as by providing a pair of downwardly depending lugs 81 and 82 on the spindle housing 2, which lugs project into a transverse slot 83 formed in the base 1. A pair of bolts 84 and 85, one extending through each of the front and rear walls of the base 1, are threadedly engaged in the lugs 81 and 82 so that by loosening one of these bolts and tightening the other, lateral shifting of the tailstock spindle 7 may be accomplished and by tightening both bolts the spindle 7 and its housing 2 may be adjusted in any desired laterally adjusted position. To guide the lateral movements of the spindle housing 2, I provide a recess 86 in the upper surface of the base 1 extending transversely across the base, the front wall 87 of the recess preferably extending perpendicularly to the surface of the base 1 while the opposite wall 88 of the recess is preferably undercut so that a portion of the upper surface of the base 1 extends inwardly above the recess 86 to form a base shoulder beneath which may be engaged a shoulder 89 formed upon a laterally extending guide slide which is formed upon and depends from the spindle housing 2. When the guide 90 is received within the recess 86, as shown in Fig. 1, the shoulder 89 underlies the shoulder 88 and the recess and guide act therefore not only to fix the path of lateral movement of the housing 2 but also act to prevent lifting of the housing 2 from its base 1. When heavy duty turning or machining of the workpiece is accomplished in a machine of this character, there is a tendency for the workpiece to be lifted, which in turn tends to lift the spindle 7. By providing the guide and guide recess as herein described, the lifting forces are transmitted directly to the base 1 which is clamped or secured to the bed of the machine as hereinbefore described, the entire lifting force being distributed substantially evenly throughout the base 1 and thus counteracting any tendency either for the housing 2 to be lifted relative to the machine bed or to be rotated relative thereto even through the clamping forces exerted by the clamping bolts 30—31 are disposed upon one side only of the spindle 7.

I prefer, however, to make the slot or recess 86 of considerably greater width than the width of the guide 90 so that when it is desired to remove the tailstock housing from its base, the housing may be slid forwardly (toward the left as shown in Fig. 1) to move the shoulder 89 from its underlying relation with respect to the shoulder 88 and then the housing may be bodily lifted from the base without requiring lateral movement thereof to remove the guide from its recess. In order to hold the guide 90 snugly fitted within the recess 86, I provide a gib 91 which may constitute a slender bar substantially filling the excess width of the recess 86, the gib 91 being pressed toward the guide 90 by a plurality of adjustable set screws 92 threaded through the forward wall of the base 1. A simple loosening of the screws 92 will permit removal of the gib 90 and thereafter the forward and upward movements of the housing 2 necessary to remove the same from the base 1 may be readily accomplished.

It will therefore be observed that I have provided a tailstock of relatively simple construction which is provided with a plurality of gear ratios disposed between the spindle and its operating handle or handwheel and in which shifting of the handle or handwheel will select one or the other of the gear ratios to permit the ready movement of the spindle at one speed when certain operations are to be accomplished and to permit the manipulation of the spindle at different speeds when other operations are to be accomplished, thus readily adapting the machine to normal turning operations or to drilling or boring operations.

Also by employing clamping mechanism as hereinbefore described, the time required to set the tailstock in a desired position may be materially reduced whenever conditions are, in the judgment of the operator, such as to require the tightening of only one of several tightening screws required while the additional screws may be employed if the machine is to be operated under such conditions as the operator believes requires additional clamping effects.

While I have shown and described the preferred embodiment of my invention, I do not desire to be limited to any of the details of construction shown or described herein, except as defined in the appended claims.

I claim:

1. In a machine tailstock, a tailstock spindle, a housing for supporting said tailstock spindle for movement forwardly and rearwardly relative to said housing, means for moving said spindle forwardly and rearwardly of said housing including a driving shaft coupled to said spindle, a handle for actuating said driving shaft, a plurality of gear sets of differing ratios interposed between said handle and said drive shaft, and means for coupling said handle to any of said gear sets to select the set of gears through which said handle will drive said driving shaft.

2. In a machine tailstock, a tailstock spindle, a housing for supporting said tailstock spindle for movement forwardly and rearwardly relative to said housing, means for moving said spindle forwardly and rearwardly of said housing including a driving shaft coupled to said spindle, a handle for actuating said driving shaft, a plurality of gear sets of differing ratios interposed between said handle and said drive shaft, and means intercoupling said handle and said gear sets shiftable relative to said gear sets to selectively engage any one of said gear sets whereby rotation of said handle at a given speed may drive said spindle at different speeds.

3. In a machine tailstock, a tailstock spindle, a housing for supporting a tailstock spindle for movement forwardly and rearwardly relative to said housing, means for moving said spindle forwardly and rearwardly of said housing including a drive shaft, means permanently coupling said shaft to said spindle, a plurality of sets of gears of differing ratios for driving said shaft, and means for selectively driving said shaft through any of said sets of gears including a handle member, a handle shaft therefor, means mounting said handle shaft for sliding movement relative to said gear sets, and means on said handle shaft for coupling said handle shaft to any one of said gear sets as said handle shaft is moved to selected positions relative to said gear sets.

4. In a machine tailstock, a tailstock spindle, a housing for supporting a tailstock spindle for movement forwardly and rearwardly relative to said housing, means for moving said spindle forwardly and rearwardly of said housing including a drive shaft, means permanently coupling said shaft to said spindle, a plurality of sets of gears of differing ratios for driving said shaft, and means for selectively driving said shaft through any of said sets of gears including a handle member, a handle shaft therefor, means mounting said handle shaft for sliding movement relative to said gear sets, and a pinion on said handle shaft and movable therewith to engage any one of said gear sets and to transmit movement of said handle to said drive shaft through the gear set selected by the position of said pinion.

5. In a machine tailstock, a tailstock spindle, a housing for supporting a tailstock spindle for movement forwardly and rearwardly relative to said housing, means for moving said spindle forwardly and rearwardly of said housing including a drive shaft, means permanently coupling said shaft to said spindle, a plurality of sets of gears of differing ratios coupled to said drive shaft to drive the same, said gear sets being arranged one behind the other, a handle member having a rotatable handle shaft for driving any one of said gear sets, means mounting said handle shaft for movement transversely of said gear sets, and means on said handle shaft and movable therewith to align with any one of said gear sets and to couple the aligned gear set to said handle member.

6. In a machine tailstock, a tailstock spindle, a housing for supporting a tailstock spindle for movement forwardly and rearwardly relative to said housing, means for moving said spindle forwardly and rearwardly of said housing including a drive shaft, means permanently coupling said shaft to said spindle, a pair of gear sets of differing ratios permanently coupled to said shaft to drive the same, said gear sets being disposed one behind the other, a handle member for rotating either of said gear sets and slidable transversely of said gear sets, and means carried by said handle member for alignment with either of said gear sets to couple said handle member to the aligned gear set.

7. In a machine tailstock, a tailstock spindle, a housing for supporting a tailstock spindle for movement forwardly and rearwardly relative to said housing, means for moving said spindle forwardly and rearwardly of said housing including a drive shaft, means permanently coupling said shaft to said spindle, a plurality of sets of gears of differing ratios coupled to said drive shaft to drive the same, said gear sets being arranged one behind the other, a handle member having a rotatable handle shaft for driving any one of said gear sets, means mounting said handle shaft for movement transversely of said gear sets, and means on said handle shaft and movable therewith to a plurality of positions in each of which said coupling means is aligned with and engaged with a different one of said gear sets to select the gear set to be driven by rotation of said handle shaft.

8. In a machine tailstock, a tailstock spindle, a housing for supporting a tailstock spindle for movement forwardly and rearwardly relative to said housing, means for moving said spindle forwardly and rearwardly of said housing including a drive shaft, means permanently coupling said shaft to said spindle, a plurality of sets of gears of differing ratios coupled to said drive shaft to drive the same, said gear sets being arranged one behind the other, a handle member having a rotatable handle shaft for driving any one of said gear sets, means mounting said handle shaft for movement transversely of said gear sets, and means on said handle shaft and movable therewith to a plurality of positions in each of which said coupling means is aligned with and engaged with a different one of said gear sets to select the gear set to be driven by rotation of said handle shaft, and means for latching said handle shaft in any selected position.

9. In a machine tailstock, a tailstock spindle, a housing for supporting a tailstock spindle for movement forwardly and rearwardly relative to said housing, means for moving said spindle forwardly and rearwardly of said housing including a drive shaft, a worm wheel of low pitch coupling said shaft to said spindle, means for driving said shaft including a pair of gear sets of different ratios permanently connected to said shaft and arranged one behind the other, a handle member, a handle shaft therefor adapted to be rotated by said handle member, means mounting said handle shaft for sliding movement parallel to the axis of said gear sets, and a pinion on said handle shaft movable therewith selectively from a position aligned with and meshed with one of said gear sets to a position aligned with and meshed with the other of said gear sets, whereby rotation of said handle member will drive said spindle at speed ratios determined by the gear set selected by the position of said pinion.

10. In a machine tailstock, a tailstock spindle, a housing for supporting a tailstock spindle for movement forwardly and rearwardly relative to said housing, means for moving said spindle forwardly and rearwardly of said housing including a drive shaft, means permanently coupling said drive shaft to said spindle, means for rotating said drive shaft including a pair of sets of gears of different diameters permanently connected with said drive shaft, a handle shaft, means mounting said handle shaft for rotation about an axis parallel with said drive shaft, and for sliding movement in the direction of said axis, a pinion fixed on said handle shaft for meshing with one of said gears when said shaft is slid to one position, a second pinion rotatable on said handle shaft and permanently meshed with the other of said gears, and having internal teeth engageable with said first pinion when said handle shaft is slid to another of its positions.

11. In a tailstock for machines, a spindle housing, a spindle bore extending longitudinally therethrough, a tailstock spindle slidably mounted within the said bore for forward and rearward movements relative to said housing, a gear rack on and extending longitudinally of said spindle, a drive pinion meshed with said rack, a drive shaft vertically disposed in said housing for supporting and operating said drive pinion, a worm wheel on said shaft, a drive shaft carrying a worm meshed with said worm gear, a pair of gears of different diameters permanently connected with said drive shaft, a handle shaft, means mounting said handle shaft for rotation about an axis parallel with said drive shaft and for sliding movement in the direction of said axis, a pinion fixed on said handle shaft for meshing with one of said gears when said shaft is slid to one position, a second pinion rotatable on said handle shaft and permanently meshed with the other of said gears and having internal teeth engageable with said first pinion when said handle shaft is slid to another of its positions.

12. In a tailstock for machines, a tailstock spindle, a spindle housing for supporting said spindle for movement forwardly and rearwardly relative to said housing, a base for said housing slidably mounted upon the bed of said machine, clamping means for clamping said tailstock in any desired position along the bed of said machine including a clamp for engaging the bed of said machine, a plate hinged to said base, a link extending between said clamp and said plate, pivot means for pivotally coupling said link to said clamp and to said plate, the axis of said pivot extending parallel to the direction of movement of said spindle housing along said bed, and a clamping screw engageable with said plate to move said plate about its hinge to draw said clamp into clamping relation upon said machine bed.

13. In a tailstock for machines, a tailstock spindle, a spindle housing for supporting said spindle for movement forwardly and rearwardly relative to said housing, a base for said housing slidably mounted upon the bed of said machine, clamping means for clamping said tailstock in any desired position along the bed of said machine including a clamp for engaging the bed of said machine, a plate hinged to said base, a link pivotally coupling said clamp to said plate, a pair of clamping screws engageable with said hinged plate, each capable of moving said plate about said hinge to draw said clamp into clamping relation with said machine bed.

14. In a tailstock for machines, a tailstock spindle, a spindle housing for supporting said spindle for movement forwardly and rearwardly relative to said housing, a base for said housing slidably mounted upon the bed of said machine, clamping means for clamping said tailstock in any desired position along the bed of said machine including a clamp for engaging the bed of said machine, a plate, pivot means hinging said plate to said base for movement about an axis extending longitudinally of said machine, one or more clamping screws engaging said plate for moving said plate about its pivot, a link disposed between said clamp and said hinge plate, means pivotally connecting opposite ends of said link to said clamp and said hinged plate, said pivot means extending longitudinally of said machine whereby clamping force exerted by any one of said clamping screws will be distributed evenly upon opposite sides of said clamp.

15. In combination with the bed of a machine having a pair of spaced ways extending longitudinally thereof, a tailstock including a spindle, a spindle housing supporting said spindle for movement longitudinally relative to said machine bed, a base for said spindle housing for slidably mounting said spindle housing upon said ways, clamping means for clamping said tailstock in any desired position along said ways including a clamp extending between said ways and having its opposite ends engageable below said ways, a plate, pivot means hingedly mounting said plate to said base for hinge movement about an axis extending parallel to said ways and disposed adjacent one of said ways, one or more clamping screws engaging said hinge plate at points disposed adjacent the opposite way, a link disposed between said hinge plate and said clamp, pivot means connecting one end of said link to said hinged plate, the axis of said pivot means extending parallel to said ways and disposed approximately centrally therebetween, and pivot means connecting the opposite end of said link to said clamp, said pivot means extending parallel to said ways and disposed approximately centrally between said ways.

16. In a tailstock construction for machines, a spindle, a spindle housing mounting said spindle for forward and rearward movements along the bed of said machine, a base for said spindle housing, means coupling said housing to said base for slidable lateral movement on said base relative to the bed of said machine including a transverse recess extending across the upper surface of said base, a shoulder on said base overhanging said recess at one side thereof, and having a shoulder at the opposite side thereof extending at right angles to the bottom of said recess, a guide depending from said housing and slidably received within said slot, said guide having a shoulder means at one side thereof underlying said overhanging shoulder on said base to prevent lifting movement of said housing relative to said base and having a rectangular shoulder formed at the opposite side of said guide, said recess having a width in excess of the width of said guide, and a rectangular cross section gib receivable in said recess between said recess and said guide to fill the excess space in said recess and to hold said base shoulder means and said guide shoulder means in overlying relation relative to each other.

FRANK P. BUCKLEIN.